Patented Sept. 30, 1941

2,257,597

UNITED STATES PATENT OFFICE 2,257,597

PREPARATION FOR COMBATING PESTS AND DISINFECTING SEEDS

Otto Fivian, Locarno-Muralto, Switzerland

No Drawing. Application September 21, 1938, Serial No. 230,956. In Great Britain September 2, 1938

2 Claims. (Cl. 167—20)

The present invention relates to a preparation which may be used both for combating pests and for disinfecting seeds, containing as its chief constituents alcohol, sulphur and dinitrocresol—the latter preferably in the form of potassium dinitro-orthocresolate.

In the following description "parts" means throughout "parts by weight."

For example, from 45 to 65 parts of alcohol may be mixed with from 20 to 30 parts of sulphur, and from 0.5 to 5 parts of potassium dinitro-orthocresolate may be added to the mixture. If desired, the mixture may be filtered, whereupon a clear liquid is obtained. From 2 to 5% of the latter—depending on the nature of the pests to be combated—may then be mixed with water, and this dilute mixture can be used for spraying as a means of combating pests.

An aqueous solution, of 1 to 1½% strength, of the mixture of alcohol and sulphur, containing at most 5% of potassium dinitro-orthocresolate, is preferably used for disinfecting seeds.

If desired, an alkali metal sulphide, such as potassium or sodium sulphide, may be added to the preparation, but not more than from 5 to 12%; in addition, the preparation may also contain a small amount of soft soap, for example from 2 to 5%.

The preparation of the present invention contains no strong poisons, such as arsenic, lead, copper or the like, and is therefore harmless to human beings, domestic and wild animals. In consequence, it may still be used for combating pests shortly before picking fruits and vegetables, without danger to consumers.

It injures neither the plants treated therewith nor seeds. Where the latter are concerned, it merely destroys the mould fungus. The sulphur contained in the preparation keeps the plants treated therewith healthy; particularly vines and roses, which are sensitive to fungus. The preparation produces no disfiguring blemishes on flowers sprayed therewith; it crystallizes immediately on being sprayed on to the same.

In addition to the above mentioned pests, all types of caterpillars, all types of insects attacking plants, beetles, cockchafer larvae, butterflies, flies and other parasites and pests may also be combated with the preparation.

What I claim is:

1. Method of preparing an aqueous solution for disinfecting seeds comprising the mixing of 1 to 1½ per cent of a mixture of alcohol and sulphur with water, adding thereto 5 per cent of potassium dinitro-orthocresolate, 5 to 12 per cent of an alkali metal sulphide and 2 to 5 per cent of soft soap.

2. Preparation for combating pests comprising 1 to 1½ per cent of a solution of sulphur in alcohol, 5 per cent of potassium dinitro-orthocresolate, 5 to 12 per cent of an alkali metal sulphide, 2 to 5 per cent soft soap, and the remainder water.

OTTO FIVIAN.